(12) United States Patent
Walden

(10) Patent No.: US 11,781,609 B2
(45) Date of Patent: Oct. 10, 2023

(54) ACTUATING ARRANGEMENT FOR A PARKING BRAKE, GEAR MECHANISM ELEMENT AND PARKING BRAKE SYSTEM

(71) Applicant: ZF Active Safety GmbH, Koblenz (DE)

(72) Inventor: Michael Walden, Vallendar (DE)

(73) Assignee: ZF Active Safety GmbH, Koblenz (DE)

( * ) Notice: Subject to any disclaimer, the term of this patent is extended or adjusted under 35 U.S.C. 154(b) by 80 days.

(21) Appl. No.: 16/637,614

(22) PCT Filed: Aug. 1, 2018

(86) PCT No.: PCT/DE2018/100676
§ 371 (c)(1),
(2) Date: Feb. 7, 2020

(87) PCT Pub. No.: WO2019/034200
PCT Pub. Date: Feb. 21, 2019

(65) Prior Publication Data
US 2020/0224737 A1 Jul. 16, 2020

(30) Foreign Application Priority Data
Aug. 16, 2017 (DE) .......................... 102017118715.4

(51) Int. Cl.
*F16D 65/14* (2006.01)
*F16D 55/226* (2006.01)
(Continued)

(52) U.S. Cl.
CPC .......... *F16D 55/2262* (2013.01); *F16D 65/18* (2013.01); *F16D 2121/14* (2013.01); *F16D 2121/24* (2013.01)

(58) Field of Classification Search
CPC .. F16D 2125/40; F16D 2125/20; F16D 65/46; F16D 65/56; F16D 65/66;
(Continued)

(56) References Cited

U.S. PATENT DOCUMENTS 1,748,486 A * 2/1930 Lord .......................... F16D 3/28
464/135
1,855,640 A * 4/1932 Lord .......................... F16D 3/28
464/132
(Continued)

FOREIGN PATENT DOCUMENTS

DE 102009012016 A1 9/2010
DE 102015204252 A1 9/2016
(Continued)

*Primary Examiner* — Nicholas J Lane
*Assistant Examiner* — Stephen M Bowes
(74) *Attorney, Agent, or Firm* — Robert James Harwood

(57) ABSTRACT

The invention relates to an actuating arrangement for a parking brake, having two components, of which one component is an actuating piston for actuating at least one brake shoe or is an intermediate element which is or can be placed in operative connection with the actuating piston, and the other component is a gear mechanism element for a stroke-imparting gear mechanism, and having a relative-rotation-preventing securing means for securing the components against rotation relative to one another. Provision is made whereby the relative-rotation-preventing securing means has at least one receptacle and a projection which engages into the receptacle, which receptacle and projection are assigned to in each case one of the components. Furthermore, at least one damping element is provided which is arranged between the projection and the receptacle.

15 Claims, 3 Drawing Sheets

(51) Int. Cl.
*F16D 65/18* (2006.01)
*F16D 121/14* (2012.01)
*F16D 121/24* (2012.01)

(58) Field of Classification Search
CPC .......... F16D 55/08; F16D 55/16; F16D 55/30; F16D 55/38; F16D 65/0006; F16D 2125/44; F16D 3/70; F16D 55/2262
USPC .......................................................... 464/70
See application file for complete search history.

(56) References Cited

U.S. PATENT DOCUMENTS

| | | | | |
|---|---|---|---|---|
| 1,943,814 | A * | 1/1934 | Cutting | F16D 3/41 464/131 |
| 3,770,082 | A | 11/1973 | Brooks et al. | |
| 4,503,595 | A * | 3/1985 | Sheill | B23P 11/00 29/434 |
| 5,931,268 | A | 8/1999 | Kingston et al. | |
| 6,145,634 | A * | 11/2000 | Holding | F16D 65/18 188/72.1 |
| 6,926,611 | B2 * | 8/2005 | Rivin | F16D 3/40 464/132 |
| 9,568,056 | B2 | 2/2017 | Platzer et al. | |
| 2013/0206520 | A1 * | 8/2013 | Sternal | B60T 7/107 188/72.6 |
| 2017/0097060 | A1 * | 4/2017 | Baehrle-Miller | B60T 13/741 |
| 2017/0159733 | A1 * | 6/2017 | Chelaidite | F16D 65/18 |

FOREIGN PATENT DOCUMENTS

| | | | | |
|---|---|---|---|---|
| GB | 2114692 A * | 8/1983 | | B60T 11/04 |
| JP | S61140626 A | 6/1986 | | |
| JP | H109305 A | 1/1998 | | |
| WO | WO-0151823 A1 * | 7/2001 | | F16D 3/28 |
| WO | 2003/027528 A1 | 4/2003 | | |
| WO | WO-2013121358 A1 * | 8/2013 | | F16D 65/183 |

* cited by examiner

ACTUATING ARRANGEMENT FOR A PARKING BRAKE, GEAR MECHANISM ELEMENT AND PARKING BRAKE SYSTEM

CROSS-REFERENCE TO RELATED APPLICATION

This application is a national stage of International Application No. PCT/DE2018/100676, filed Aug. 1, 2018, the disclosure of which is incorporated herein by reference in its entirety, and which claimed priority to [German/UK] Patent Application No. 102017118715.4, filed Aug. 16, 2017, the disclosure of which is incorporated herein by reference in its entirety.

TECHNICAL FIELD

The invention relates to an actuating arrangement for a parking brake, having two components, of which one component is an actuating piston for actuating at least one brake shoe or is an intermediate element which is or can be placed in operative connection with the actuating piston, and the other component is a gear mechanism element for a stroke-imparting gear mechanism. The invention also relates to a gear mechanism element for a spindle-type stroke-imparting gear mechanism. The invention also relates to a parking brake system.

BACKGROUND

Parking brakes, also referred to as immobilizing brakes, are used for example in motor vehicles. They commonly serve for holding a motor vehicle at a standstill, for example when the motor vehicle is situated on a roadway with a gradient. Parking brakes are also commonly designed to hold the motor vehicle at a standstill over a relatively long period of time, for example when the driver is absent.

Parking brakes have at least one brake shoe and one actuating piston for actuating the brake shoe. During an actuation, the actuating piston pushes the brake shoe for example against a brake disk which is connected rotationally conjointly to a vehicle wheel, whereby a parking braking action or immobilizing braking action is realized. The actuation of the actuating piston is commonly effected by an electric motor which, for this purpose, is correspondingly electrically activated and exerts a mechanical drive force on the actuating piston, by means of which the actuating piston performs a translational positioning movement. Since the mechanical drive force is commonly effected by a rotational movement of an output shaft of the electric motor, parking brakes commonly have a spindle-type stroke-imparting gear mechanism with a threaded spindle and a threaded nut in order to convert the rotational movement into a translational movement that can be utilized for the actuating piston.

To ensure the gear mechanism function of the spindle-type stroke-imparting gear mechanism, the threaded nut is commonly secured against rotation relative to the actuating piston by virtue of projections of the threaded nut engaging into receptacles of the actuating piston. In certain situations, for example during driving operation of the motor vehicle, undesired brief instances of contact between the projections and the receptacles may sometimes arise owing to vibrations, which instances of contact are in some cases noticeable as an audible rattling noise.

SUMMARY

It is therefore an object of the invention to propose at least one possibility for counteracting such rattling noises.

Said object is achieved by means of an actuating arrangement which has the features of claim 1. A gear mechanism element having the features of claim 13 and a parking brake system having the features of claim 14 are also proposed for the purposes of achieving the object. Advantageous embodiments and/or refinements and/or aspects of the invention emerge from the subclaims, from the following description, and from the figures.

An underlying actuating arrangement for a parking brake comprises at least two components, of which one component is an actuating piston for actuating at least one brake shoe or is an intermediate element which is or can be placed in operative connection with the actuating piston, and the other component is a gear mechanism element for a stroke-imparting gear mechanism. The actuating arrangement furthermore comprises a relative-rotation-preventing securing means for securing the components against rotation relative to one another. The relative-rotation-preventing securing means has at least one receptacle and a projection which engages into the receptacle, the receptacle and projection being assigned to in each case one of the components. The gear mechanism element may be a nut element for the stroke-imparting gear mechanism. Alternatively, the gear mechanism element may be a threaded spindle for the stroke-imparting gear mechanism.

In one embodiment, the actuating arrangement has at least one damping element, which is arranged between the projection and the receptacle. By means of the damping element, a measure is implemented for damping any vibrations of the gear mechanism element and/or of the actuating piston to such an extent that undesired brief instances of contact of wall portions of the projection against wall portions of the receptacle are entirely or partially prevented. Such vibrations may arise for example during driving operation of a vehicle equipped with a parking brake system which has the actuating arrangement, wherein such vibrations can give rise to undesired rattling noises owing to vibrational contact of the projection against the actuating piston. Such undesired rattling noises are counteracted by the damping element. The damping action of the damping element that is utilized may be based on an intentionally allowed deformation of the damping element.

It is expedient if the damping element is assigned to, in particular fastened to or mounted on, one of the components. In this way, the installation of the damping element on the actuating arrangement is easy to realize because the damping element is or can be mounted on one of the components already before the assembly of the actuating arrangement.

It is furthermore expedient if, in a radial direction and/or in a circumferential direction with respect to the longitudinal axis of the actuating arrangement, the projection engages with play into, or is held with play in, the receptacle, in particular taking into consideration the damping element. In this way, the damping element is relieved of load, because no or at least negligible deformation forces act on the damping element if the above-described vibrations are not presently acting and/or an actuation of the actuating piston is taking place, for example during an immobilizing braking operation.

The longitudinal axis of the actuating arrangement is to be understood in particular to mean the axis that corresponds to the longitudinal axis of the gear mechanism element and/or a longitudinal axis of the actuating piston. For example, the longitudinal axis of the actuating piston and the longitudinal axis of the gear mechanism element lie on a common axis, which forms the longitudinal axis of the actuating arrangement.

Provision is made in particular whereby, in a circumferential direction about the longitudinal axis of the actuating arrangement, the damping element is arranged between the projection and the receptacle. In this way, any vibrations of the gear mechanism element and/or of the actuating piston with an action component in a circumferential direction, and a possible resulting rattling noise, are counteracted.

In addition or alternatively, provision may be made whereby, in a radial direction with respect to the longitudinal axis of the actuating arrangement, the damping element is arranged between the projection and the receptacle. In this way, any vibrations of the gear mechanism element and/or of the actuating piston with an action component in a radial direction, and a possible resulting rattling noise, are counteracted.

In one possible embodiment and/or refinement, as viewed in a circumferential direction around the longitudinal axis of the actuating arrangement, the projection has a first abutment surface and a stop surface, which are assigned to, in particular correspond to, a first counterpart abutment surface and a counterpart stop surface of the receptacle. For example, provision is made whereby the stop surface and the counterpart stop surface are present with a spacing to one another, the first abutment surface and the first counterpart abutment surface are present with a spacing to one another, and the damping element is arranged with a thickness between the first abutment surface and the first counterpart abutment surface. Furthermore, provision is for example made whereby the spacing between the stop surface and counterpart stop surface is smaller than the spacing between the first abutment surface and the first counterpart abutment surface, and the spacing between the first abutment surface and the first counterpart abutment surface is in turn smaller than the thickness of the damping element. In this way, when a torque acts in one circumferential direction, it is firstly the case that the damping element is acted on, and imparts its damping action with respect to the torque, before the relative-rotation-preventing securing means acts as a result of contact of the stop surface and counterpart stop surface with one another. In this way, the damping element is relieved of load, because it is provided outside the contact surfaces that impart the securing function, specifically the stop surface and the counterpart stop surface.

In addition or alternatively, the actuating arrangement may be formed in the other circumferential direction. For example, as viewed in the other circumferential direction around the longitudinal axis of the actuating arrangement, the projection has a further first abutment surface and a further stop surface, which are assigned to, in particular correspond to, a further first counterpart abutment surface and a further counterpart stop surface of the receptacle. Provision is for example made whereby the further stop surface and the further counterpart stop surface are present with a spacing to one another, the further first abutment surface and the further first counterpart abutment surface are present with a spacing to one another, and the damping element is arranged with a or the thickness between the further first abutment surface and the further first counterpart abutment surface. Provision is for example furthermore made whereby the spacing between the further abutment surface and the further counterpart abutment surface is smaller than the spacing between the further first abutment surface and the further first counterpart abutment surface, and the spacing between the further first abutment surface and the further first counterpart abutment surface is in turn smaller than the thickness of the damping element. For example, the receptacle and/or the projection are of axisymmetrical design with respect to their radially arranged bisector. This promotes a situation in which the relative-rotation-preventing securing means imparts the same action in both circumferential directions. Production-related advantages are also achieved in this way.

The thickness of the damping element is to be understood in particular to mean the extent of the damping element between the first abutment surface and the first counterpart abutment surface and/or between the further first abutment surface and the further first counterpart abutment surface. In this respect, the thickness of the damping element relates to the circumferential direction with respect to the actuating arrangement.

In one refinement of the actuating arrangement, provision is made whereby, as viewed in a radial direction with respect to the longitudinal axis of the actuating arrangement, the projection has a second abutment surface and a radial end, wherein the second abutment surface is assigned to a second counterpart abutment surface of the receptacle and the radial end is assigned to a base surface of the receptacle, and wherein the damping element is arranged with a width between the second abutment surface and the second counterpart abutment surface, in particular is arranged with play with respect to the second abutment surface and/or with respect to the second counterpart abutment surface. In this way, damping of any vibrations in a radial direction is also made possible by means of the damping element. For this purpose, provision may furthermore be made whereby the second abutment surface is set back from the radial end with a spacing which is greater than the width of the damping element, and the second counterpart abutment surface is set forward in relation to the base surface with a spacing which is greater than the spacing between the second abutment surface and the radial end of the projection. This measure has the aim of preventing contact of the base surface of the receptacle and the radial end of the projection with one another, even if vibrations in a radial direction arise and the damping element then imparts its damping action.

The width of the damping element is to be understood in particular to mean the extent of the damping element between the second abutment surface and the second counterpart abutment surface. In this respect, the width of the damping element relates to the radial direction with respect to the longitudinal axis of the actuating arrangement.

The damping element may be of ring-shaped form, wherein the damping element engages around the projection. For example, the ring-shaped damping element is pushed onto the projection. In this respect, the projection engages through the interior of the ring-shaped damping element. For example, the damping element is an O-ring. This promotes an inexpensive solution for preventing rattling noises, because ring-shaped elements, in particular O-rings, are a mass-produced component which are produced in large quantities and are thus inexpensive.

If the damping element is arranged on the component with the projection, provision may be made whereby the second abutment surface of the projection, against which the seal element can be supported in a radial direction, at least partially runs obliquely inward with increasing spacing to the radial end of the projection. This promotes the realization of a sufficient holding action for the ring-shaped damping element.

Provision may furthermore be made whereby the ring-shaped damping element bears under preload against the projection. In this way, the damping element is captivity fastened to the projection. This also yields advantages during the assembly of the actuating arrangement.

It is furthermore expedient if, as viewed in a radially outward direction with respect to the longitudinal axis of the actuating arrangement, the first abutment surface is arranged in front of the stop surface. It is furthermore expedient if, as viewed in a radially outward direction with respect to the longitudinal axis of the gear mechanism element, the further first abutment surface is arranged in front of the further stop surface.

As an alternative to the ring-shaped form, the damping element may be of cap-shaped form and be for example fitted onto the end of the projection. In this case, as viewed in a radially outward direction with respect to the longitudinal axis of the actuating arrangement, the stop surface may be arranged in front of the first abutment surface of the projection. Also, as viewed in a radially outward direction with respect to the longitudinal axis of the gear mechanism element, the further stop surface may be arranged in front of the further first abutment surface of the projection.

The damping element should be composed of a deformable material or have such a material. For example, the damping element has a rubberlike material or is composed of rubberlike material. One possible refinement consists in the damping element being composed of rubber material or having rubber material. Such a rubber material may be an EPDM rubber.

In one embodiment and/or refinement of the actuating arrangement, provision may be made for the receptacle and the projection to each be provided at least twofold as a receptacle/projection pairing. In particular, the receptacles and the projections are then arranged so as to be distributed over the circumference of the respectively associated components. In particular, at least one of the receptacle/projection pairings has the damping element. These measures have the aim of providing a stable and durable relative-rotation-preventing securing action.

According to one aspect of the invention, a gear mechanism element for a spindle-type stroke-imparting gear mechanism is provided. The gear mechanism element has a main body bearing a thread, has at least one projection protruding radially away from a wall portion of the main body, and has at least one damping element which, as viewed in a circumferential direction around the longitudinal axis of the gear mechanism element, is provided on the projection. The gear mechanism element may be a threaded spindle or a threaded nut for the spindle-type stroke-imparting gear mechanism. In particular, the gear mechanism element can be utilized in the above-described actuating arrangement. In this respect, the projection and the damping element may correspond to the projection and the damping element of the above-described actuating arrangement.

According to a further aspect of the invention, a parking brake system for a motor vehicle is provided, which parking brake system utilizes the above-described actuating arrangement, wherein the actuating piston of the actuating arrangement serves for actuating at least one brake shoe, and the gear mechanism member of the actuating arrangement is a constituent part of a stroke-imparting gear mechanism which is connected in terms of drive to an electric motor.

In one refinement, the parking brake system comprises an electronic control unit for activating the electric motor, wherein the control unit and the electric motor are configured to adjust, in particular continuously variably adjust, a parking brake force exerted by the brake shoe in accordance with one or more setpoint values, in order to perform an immobilizing braking operation. For example, the setpoint values comprise or are based on information items regarding the gradient of the roadway and/or the friction coefficient of the roadway lining and/or regarding the present driving state or standstill state of the motor vehicle and/or regarding characteristic variables of the motor vehicle, such as for example the loading state. A controlled adjustment of the parking brake force exerted by the at least one associated brake shoe is thus made possible, and brake force metering, for example for a comfortable launch of the motor vehicle, in particular on a roadway with a gradient, can be performed.

BRIEF DESCRIPTION OF THE DRAWINGS

Further details and features of the invention will emerge from the following description of an exemplary embodiment on the basis of the drawings.

DETAILED DESCRIPTION

Figure 1:
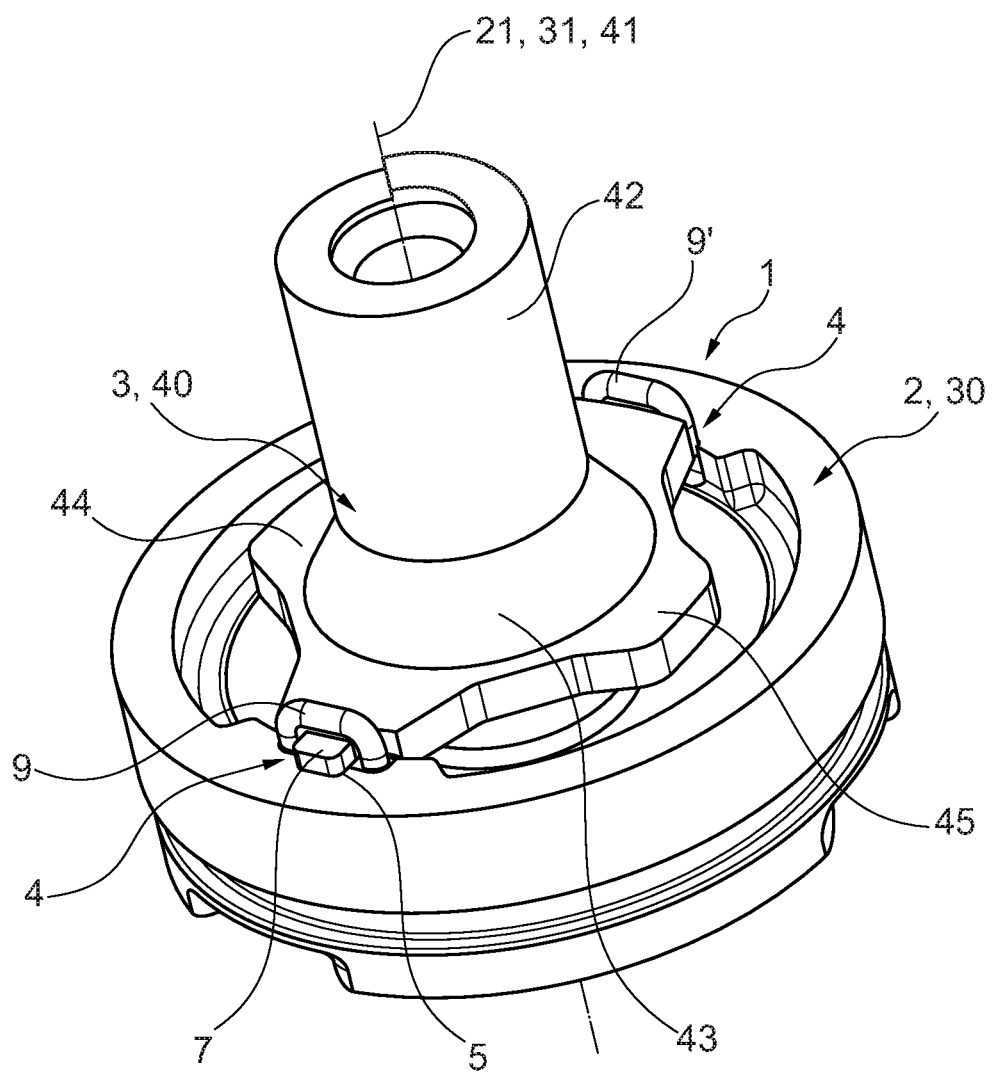
FIG. 1 shows a possible embodiment of an actuating arrangement for a parking brake, having an actuating piston, a gear mechanism element and a relative-rotation-preventing securing means, for preventing rotation of the gear mechanism element relative to the actuating piston, in a perspective illustration.
Figure 2:
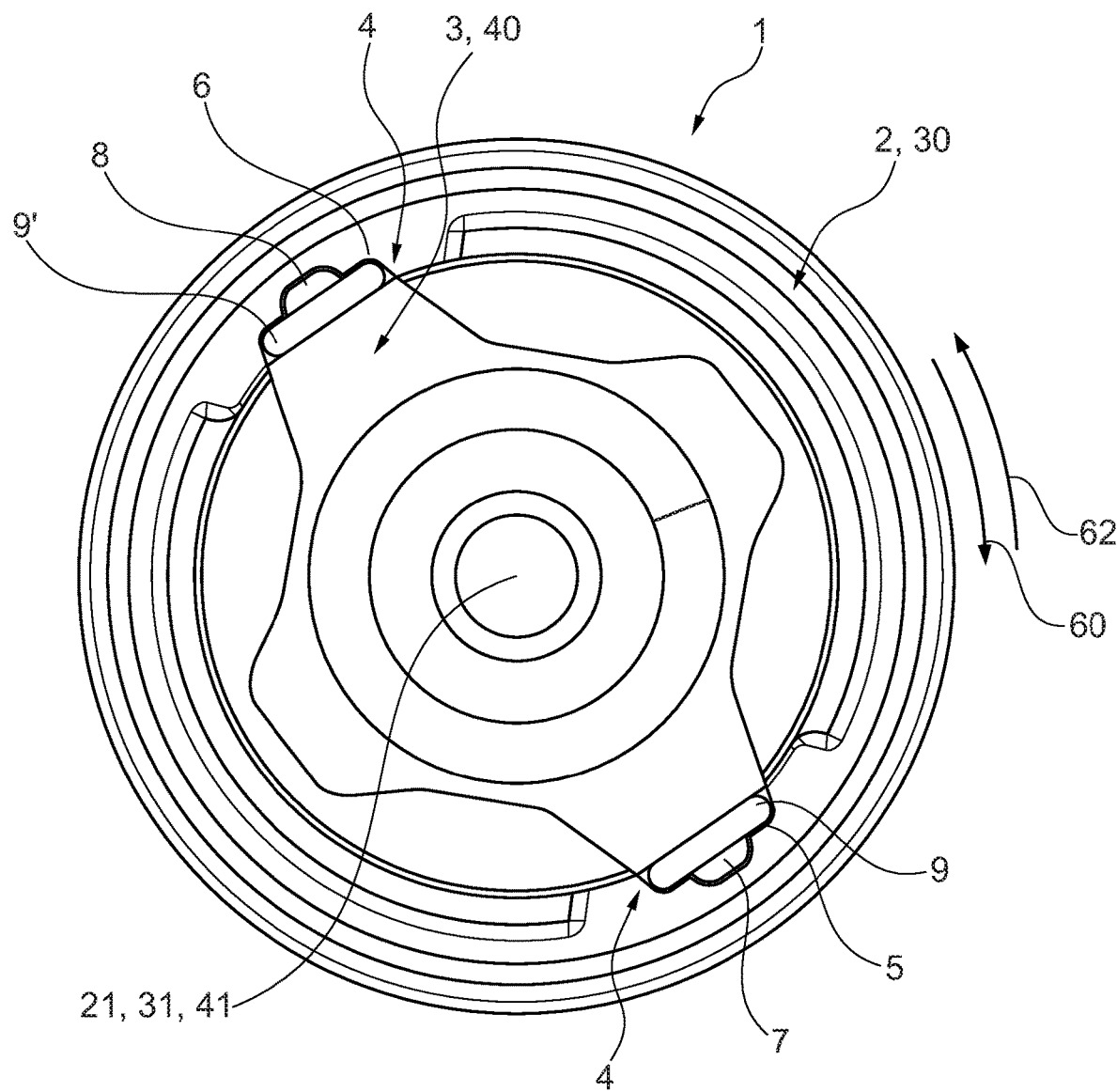
FIG. 2 shows the actuating arrangement of FIG. 1 in a plan view.

FIG. 1 shows—in a schematic illustration—a possible embodiment of an actuating arrangement 1 for a parking brake in a perspective view. The parking brake is for example a constituent part of a parking brake system which is used in a motor vehicle. FIG. 2 shows the actuating arrangement 1 in a plan view. The actuating arrangement 1 comprises at least two components 2, 3, of which one component 2 is an actuating piston 30 for actuating at least one brake shoe or is an intermediate element which is or can be placed in operative connection with the actuating piston 30, and the other component 3 is a transmission mechanism element 40 for a stroke-imparting gear mechanism.

The gear mechanism element 40 is for example a threaded nut or a nut element for the stroke-imparting gear mechanism, which threaded nut or nut element can for example interact with a threaded spindle in order to convert a rotational drive movement into a translational output movement. The rotational drive movement may be performed by an electric motor, which is for example a constituent part of the parking brake system. The translational output movement of the threaded element 30 serves for the actuation of the actuating piston 30, which thereby presses the brake shoe for example against a brake disk connected to a vehicle wheel, and thus performs a parking braking or immobilizing braking operation. Preferably, for this purpose, the longitudinal axis 31 of the actuating piston 30 and the longitudinal axis 41 of the gear mechanism element 40 lie on a common axis, which forms for example the longitudinal axis of the actuating arrangement 1.

To ensure the gear mechanism function of the stroke-imparting gear mechanism, the actuating arrangement 1 has a relative-rotation-preventing securing means 4 for securing the components 2, 3 against rotation relative to one another. The relative-rotation-preventing securing means 4 is formed by virtue of a projection 7 engaging into a receptacle 5, whereby the components 2, 3 are supported rotationally conjointly relative to one another. The receptacle 5 and the projection 7 are assigned to in each case one of the components 2, 3. For example, the receptacle 5 is assigned to the actuating piston 30 and the projection 7 is assigned to the gear mechanism element 40. In addition to this, it is possible for at least one further receptacle 6 and at least one further projection 8, which engages into the further receptacle 6, to be provided, which are likewise constituent parts of the relative-rotation-preventing securing means 4. The further receptacle 6 and the further projection 8 are preferably of identical design to the receptacle 5 and to the projection 7, such that, below, for the sake of simplicity, the description is directed primarily to the receptacle 5 and the projection 7.

The projection 7 is preferably arranged so as to protrude radially outward from a main body 32 of the gear mechanism element 4 in relation to the longitudinal axis 41 thereof. For example, the projection 7 is a constituent part of a preferably encircling collar 43 which is radially elevated from the main body 42. The projections 7 and 8 are preferably arranged diametrically opposite one another. At least one, preferably two, balancing projections 44, 45 are preferably arranged in between, for example rotationally offset by approximately 90 degrees, which balancing projections for example each project radially outward diametrically opposite one another.

In the actuating arrangement 1, there is furthermore provided at least one damping element 9, which is arranged between the projection 8 and the receptacle 5. A damping element 9' is preferably also arranged between the projection 7 and the receptacle 6. The damping element 9' is preferably of identical design to the damping element 9, such that, below, for the sake of simplicity, the description is directed primarily to the damping element 9.

Any vibrations of the gear mechanism element 40 and/or of the actuating piston 30 can be damped by means of the damping element 9, such that undesired brief instances of contact of the projection 7 and of the receptacle 5 with one another, and a resulting undesired rattling noise, are prevented. Such vibrations may arise for example during driving operation of a vehicle in which the actuating arrangement 1 is provided as a constituent part of a parking brake system. The damping action of the damping element 9 is based preferably on a deformation of the damping element 9. The damping element 9 is preferably elastically deformable. The damping element 9 has for example a deformable material such as for example a rubberlike material, in particular an EPDM rubber.

Figure 3:
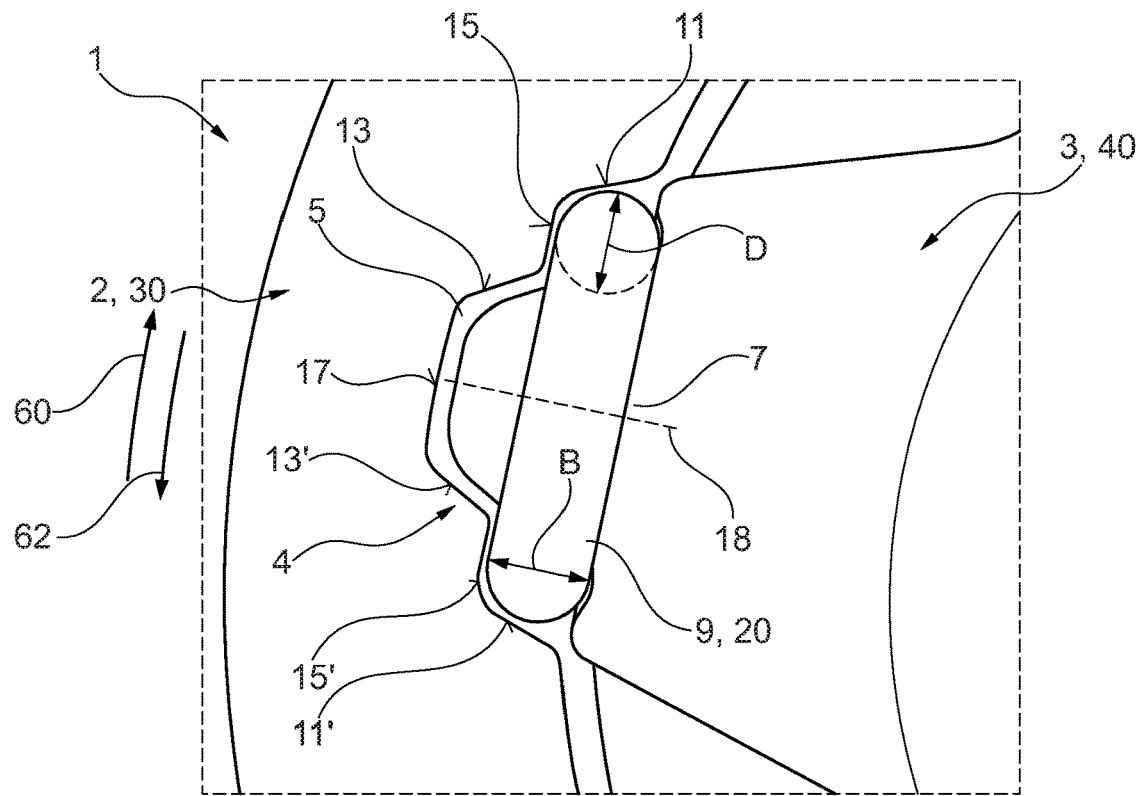
FIG. 3 shows an enlarged detail of the actuating arrangement of FIG. 1 in the region of the relative-rotation-preventing securing means.
Figure 4:
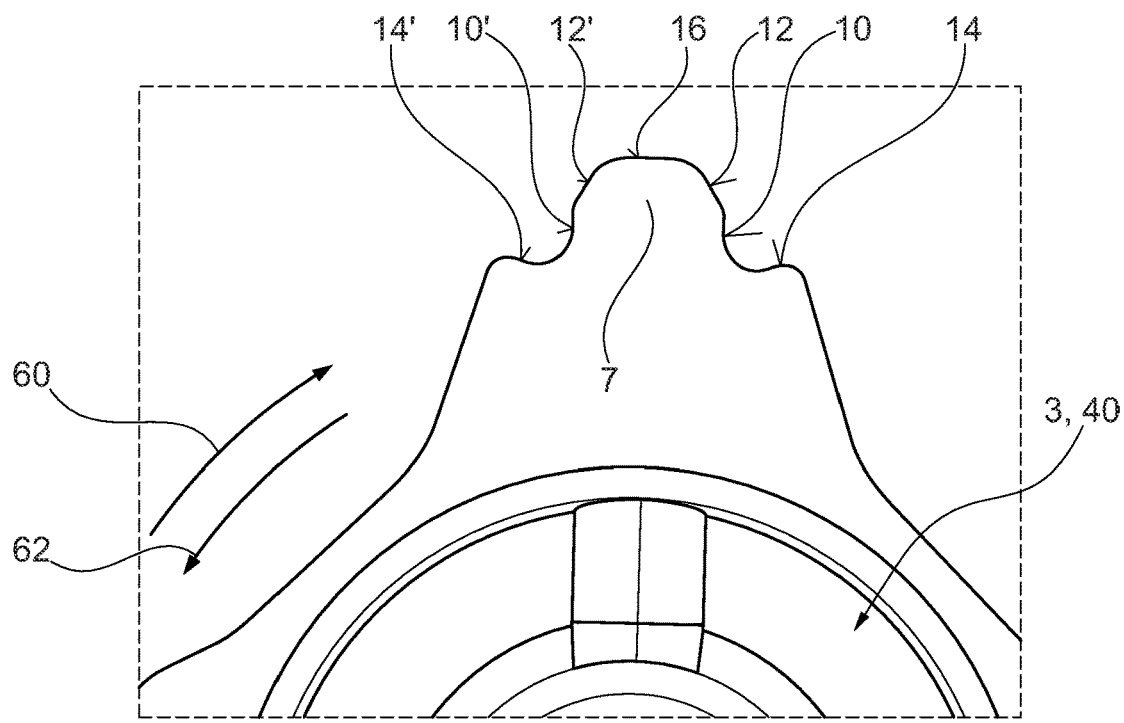
FIG. 4 shows an enlarged detail of the gear mechanism element of the actuating arrangement according to FIG. 1 in the region of a projection that forms the relative-rotation-preventing securing means.

FIGS. 3 and 4 show the actuating arrangement 1 in each case in an enlarged detail in the region of the relative-rotation-preventing securing means 4 and illustrate the design of the receptacle 5 and of the projection 7 utilizing the damping element 9. As can be seen in particular from FIG. 3, it is preferably the case that, in a radial direction and/or in a circumferential direction of the longitudinal axis 21 of the actuating arrangement 1, the projection 7 is received in the receptacle 6 with play despite the damping element 9 provided. There, the damping element 9 is of ring-shaped form, for example is formed by an O-ring 20, which is pushed onto the projection 7, that is to say is fastened to said projection, and is possibly seated on the projection 7 under preload. By means of the selected design of the receptacle 5 and of the projection 7, vibration-induced contact of the projection 7 and of the receptacle 5 with one another in a circumferential direction with respect to the longitudinal axis 21 of the actuating arrangement 1 is prevented by the damping element 9.

The construction is configured such that, when a torque exerted for example by the gear mechanism element 40 acts in a direction around the longitudinal axis 21 of the actuating arrangement 1, contact of the projection 7 with the receptacle 5 occurs. For this purpose, provision is preferably made whereby, as viewed in a circumferential direction around the longitudinal axis 21 of the actuating arrangement 1, for example as viewed in the circumferential direction as per arrow 62, the projection 7 has a first abutment surface 10 and a stop surface 12, which are assigned to a first counterpart abutment surface 11 and to counterpart stop surface 13 of the receptacle 5, wherein the stop surface 12 and the counterpart stop surface 13 are present with a spacing to one another, the first abutment surface 10 and the first counterpart abutment surface 11 are present with a spacing to one another, and the damping element 9 is arranged with a thickness D between the first abutment surface 10 and the first counterpart abutment surface 11. Provision is preferably furthermore made whereby the spacing between the stop surface 12 and the counterpart stop surface 13 is smaller than the spacing between the first abutment surface 10 and the first counterpart abutment surface 11, and the spacing between the first abutment surface 10 and the first counterpart abutment surface 11 is in turn smaller than the thickness D of the damping element 9.

In order, in the event of a torque acting in the other direction around the longitudinal axis 21 of the actuating arrangement 1, for example in the circumferential direction as per arrow 60, to permit a securing function of the relative-rotation-preventing securing means by contact of the projection 7 against the receptacle 5, it is preferable if, on the projection 7, there are provided a further first abutment surface 10' and a further stop surface 12', which are assigned to a further first counterpart abutment surface 11' and a further counterpart stop surface 13' of the receptacle 5, wherein the further stop surface 12' and the further counterpart stop surface 13' are present with a spacing to one another, the further first abutment surface 10' and the further first counterpart abutment surface 11' are present with a spacing to one another, and the damping element 9 is arranged between the further first abutment surface 10' and the further first counterpart abutment surface 11'. It is preferable if the spacing between the further stop surface 12' and the further counterpart stop surface 13' is smaller than the spacing between the further first abutment surface 10' and the further first counterpart abutment surface 11' and if the spacing between the further first abutment surface 10' and the further first counterpart abutment surface 11' is smaller than the thickness D of the damping element 9.

In order to be able to produce the projection 7 and the receptacle 5 in both circumferential directions in a simple manner, provision is preferably made whereby the receptacle 5 and the projection 7 are of axisymmetrical design with respect to their radially arranged bisector 18 (FIG. 3). It is preferable if the first abutment surface 10 and the further first abutment surface 10' form the outer circumference of a portion of the projection 7 which is inserted into the ring-shaped seal element 9, and on which the inner circumference of the ring-shaped damping element 9 is or can be supported.

The projection 7 preferably has a second abutment surface 14 and a further second abutment surface 14' which constitute a radial delimitation for the insertion of the projection 7 into the ring-shaped damping element 9 and which are preferably arranged transversely with respect to the first abutment surface 10 and/or the further first abutment surface 10'. For example, the second abutment surface 14 and the further second abutment surface 14' run obliquely inward with increasing spacing to a radial end 16 of the projection 7 in order to promote an optimum seat of the ring-shaped damping element 9 on the projection 7.

By means of the damping element 9 of ring-shaped design, provision is furthermore made whereby the wall portions required for the relative-rotation-preventing securing means 4, in particular the stop surface 12 and the further stop surface 12' and also the counterpart stop surface 13 and the further counterpart stop surface 13', are formed in that portion of the projection 7 which projects radially outward from the damping element 9. To counteract possible vibrations of the actuating piston 30 and/or of the gear mechanism element 40 which act in a radial direction, provision is made whereby, as viewed in a radial direction with respect to the longitudinal axis 21 of the actuating arrangement 1, the second abutment surface 14 is set back from the radial end 16 of the projection 7 with a spacing which is greater than the width B of the damping element 9, and the second counterpart abutment surface 15 is set forward in relation to a base surface 17 of the receptacle 5 with a spacing which is greater than the spacing between the second abutment surface 14 and the radial end 16 of the projection 7.

In the same way, the further second abutment surface 14' may be set back from the radial end 16 of the projection 7 with a spacing which is greater than the width B of the damping element 9, and a second counterpart abutment surface 15' of the receptacle 5 is set forward in relation to the base surface 17 thereof with a spacing which is greater than the spacing between the further second abutment surface 14' and the radial end 16 of the projection 7. The width B of the damping element 9 relates to the extent of the damping element 9 between the second abutment surface 14 and the second counterpart abutment surface 15 and, respectively, between the further second abutment surface 14' and the further second counterpart abutment surface 15'. For example, the second abutment surface 14 and the further second abutment surface 14' lie in a common plane or substantially in a common plane. For example, the second counterpart abutment surface 15 and the further second counterpart abutment surface 15' lie in a common plane or substantially in a common plane.

In the present description, the reference to a particular aspect or to a particular embodiment or to a particular refinement means that a particular feature or a particular characteristic described in conjunction with the respective aspect or the respective embodiment or the respective refinement is at least included therein but need not necessarily be included in all aspects or embodiments or refinements of the invention. It is expressly pointed out that any combination of the various features and/or structures and/or characteristics described with regard to the invention are encompassed by the invention unless this is expressly or unequivocally contradicted by the context.

The use of individual or all examples or of an exemplary form of expression in the text is intended merely for illustrating the invention and does not constitute a limitation with regard to the scope of the invention, unless stated otherwise. Also, no form of expression or wording of the description is to be understood as referring to an element which is not claimed but which is essential for the practical implementation of the invention.

The invention claimed is:

1. An actuating arrangement for a parking brake comprising:
    a pair of components, of which one component is an actuating piston for actuating at least one brake shoe or is an intermediate element which is or can be placed in operative connection with the actuating piston, and the other component is a gear mechanism element for a stroke-imparting gear mechanism, and
    a relative-rotation-preventing securing means for securing the components against rotation relative to one another about a longitudinal axis while permitting the components to move axially together along the longitudinal axis,
    wherein the relative-rotation-preventing securing means has at least one receptacle and at least one projection which engages into the at least one receptacle, which receptacle and projection are assigned to in each case one of the components, and wherein each of the at least one projection includes a corresponding damping element arranged between the projection and the corresponding receptacle such that the damping element is confined in the circumferential direction by the corresponding receptacle,
    wherein, as viewed in the circumferential direction around the longitudinal axis of the actuating arrangement, the projection has a first abutment surface and a stop surface which are assigned to a first counterpart abutment surface and a counterpart stop surface of the receptacle, wherein the stop surface and the counterpart stop surface are present with a spacing to one another, the first abutment surface and the first counterpart abutment surface are present with a spacing to one another, and the damping element is arranged with a thickness between the first abutment surface and the first counterpart abutment surface, and wherein the spacing between the stop surface and the counterpart stop surface is smaller than the spacing between the first abutment surface and the first counterpart abutment surface and the spacing between the first counterpart abutment surface and the damping element is smaller than the spacing between the stop surface and the counterpart stop surface.

2. The actuating arrangement as claimed in claim 1, wherein the damping element is fastened to one of the components.

3. The actuating arrangement as claimed in claim 1, wherein in a radial direction and/or in the circumferential direction with respect to the longitudinal axis of the actuating arrangement, the projection engages with play into the receptacle.

4. The actuating arrangement as claimed in claim 1 wherein the receptacle and the projection are of axisymmetrical design with respect to the centerline.

5. The actuating arrangement as claimed in claim 1 wherein the damping element is an O-ring that engages around the projection.

6. The actuating arrangement as claimed in claim 1 wherein the damping element comprises a rubber material.

7. The actuating arrangement as claimed in claim 1 wherein the at least one receptacle and the at least one projection comprise multiple projections engaging multiple receptacles, and the receptacles and the projections are arranged so as to be distributed over the circumference of the respectively associated components, wherein the at least one damping element comprises multiple damping elements provided separately for each engaging pair of the receptacle/projection.

8. The actuating arrangement as claimed in claim 1 wherein the gear mechanism element is a nut element for the stroke-imparting gear mechanism.

9. The actuating arrangement as claimed in claim 1, wherein each damping element has a first condition spaced from the receptacle prior to relative rotation between the components and a second condition engaging the receptacle in response to a predetermined degree of relative rotation between the components.

10. The actuating arrangement as claimed in claim 1, wherein each damping element is spaced from and extends about a centerline extending radially from the longitudinal axis and through the corresponding projection.

11. The actuating arrangement as claimed in claim 1, wherein each receptacle includes a pair of abutment surfaces positioned on opposite sides of the damping element and extending transversely relative to the circumferential direction.

12. The actuating arrangement as claimed in claim 1, wherein the at least one receptacle and the at least one projection comprise multiple projections engaging multiple receptacles, wherein one of the damping elements extends around each of the projections.

13. The actuating arrangement as claimed in claim 12, wherein the damping elements are spaced apart from one another about the longitudinal axis.

14. An actuating arrangement for a parking brake comprising:
- a pair of components, of which one component is an actuating piston for actuating at least one brake shoe or is an intermediate element which is or can be placed in operative connection with the actuating piston, and the other component is a gear mechanism element for a stroke-imparting gear mechanism, and
- a relative-rotation-preventing securing means for securing the components against rotation relative to one another about a longitudinal axis while permitting the components to move axially together along the longitudinal axis, wherein the relative-rotation-preventing securing means has at least one receptacle and at least one projection which engages into the at least one receptacle, which receptacle and projection are assigned to in each case one of the components, and wherein each of the at least one projection includes a corresponding damping element arranged between the projection and the corresponding receptacle such that the damping element is confined in the circumferential direction by the corresponding receptacle, wherein, as viewed in a radial direction with respect to the longitudinal axis of the actuating arrangement, the projection has a second abutment surface and a radial end, wherein the second abutment surface is assigned to a second counterpart abutment surface of the receptacle and the radial end is assigned to a base surface of the receptacle, wherein the damping element is arranged with a width between the second abutment surface and the second counterpart abutment surface, and wherein the second abutment surface is set back from the radial end with a spacing which is greater than the width of the damping element, and the second counterpart abutment surface is set forward in relation to the base surface with a spacing which is greater than the spacing between the second abutment surface and the radial end of the projection.

15. The actuating arrangement as claimed in claim 6, wherein the damping element is arranged with play with respect to the second abutment surface and/or with respect to the second counterpart abutment surface.

\* \* \* \* \*